May 13, 1941.  W. JOHNSTON, JR  2,242,075
CINDER POT ASSEMBLY
Filed July 8, 1940   2 Sheets-Sheet 2
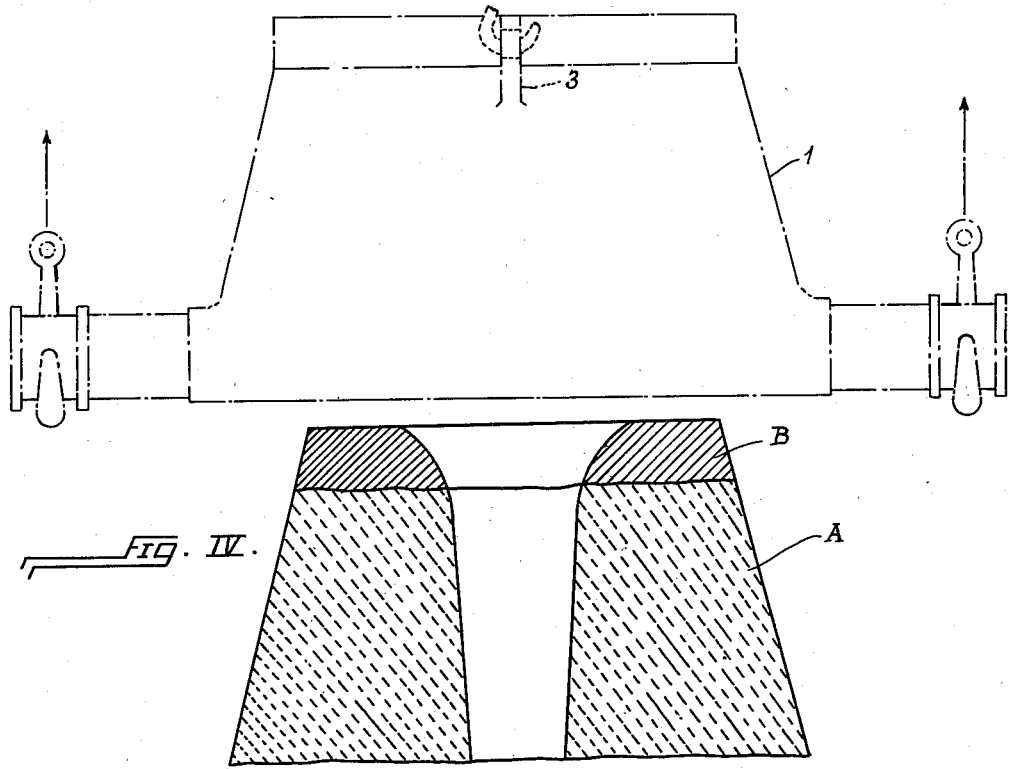
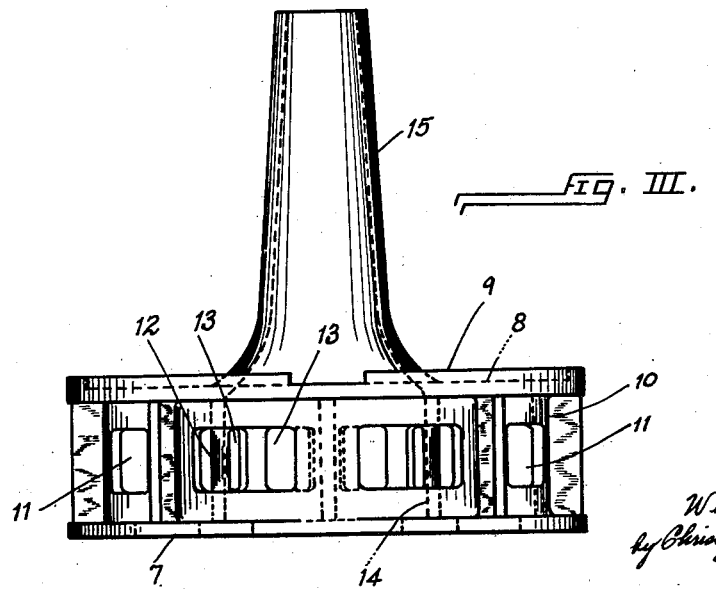
INVENTOR
William Johnston, Jr.
by Christy, Parmelee and Wharton
his attorneys Patented May 13, 1941

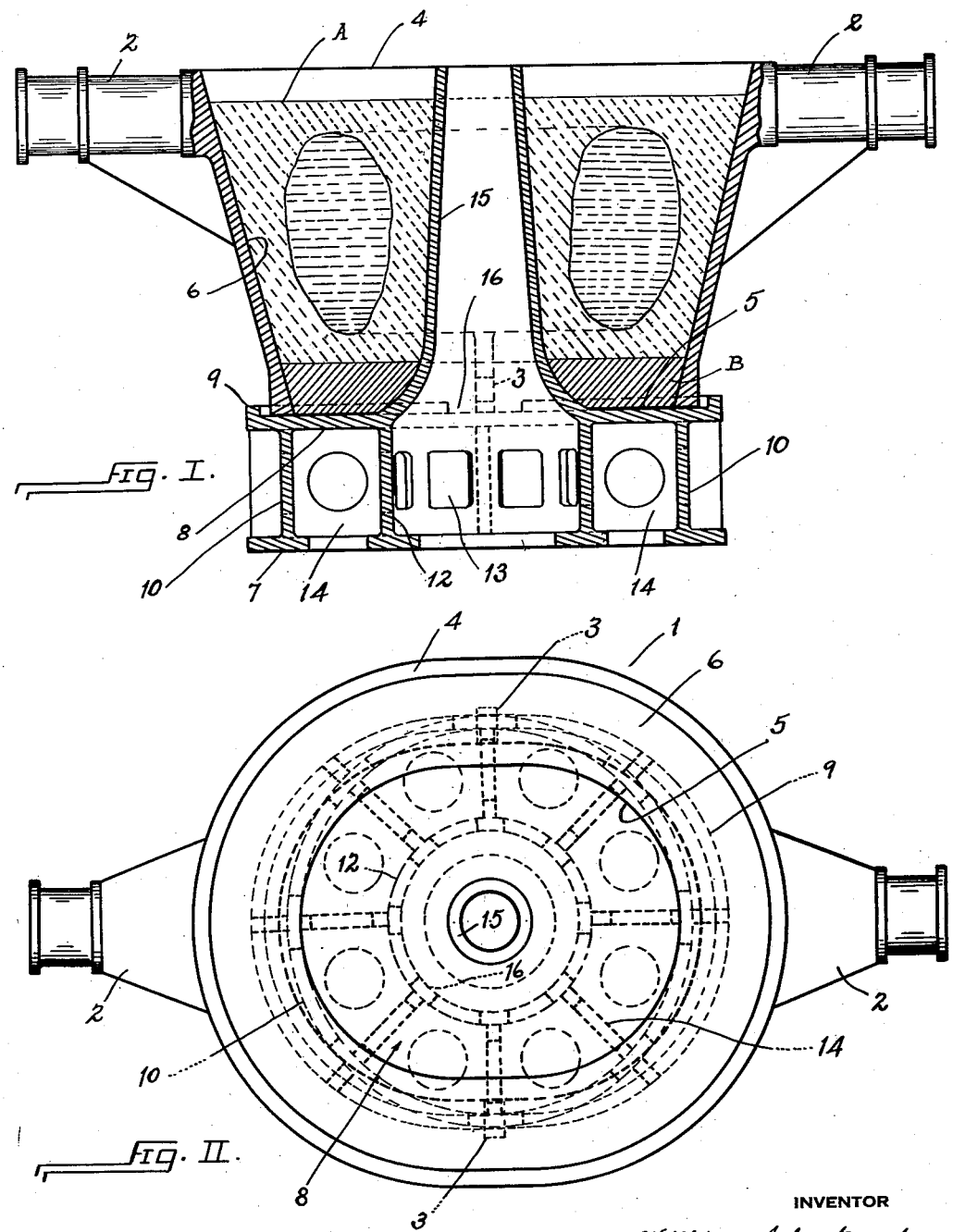

2,242,075

UNITED STATES PATENT OFFICE 2,242,075

CINDER POT ASSEMBLY

William Johnston, Jr., Wilkinsburg, Pa.

Application July 8, 1940, Serial No. 344,413

2 Claims. (Cl. 266—39)

This invention relates to a cinder pot for slags and cinder formed in steel-making, and particularly to a cinder pot assembly which is well adapted to the reception and handling of slag from open hearth furnaces.

Open-hearth slag differs from blast furnace slag in being much denser and more adhesive in cooling than blast furnace slag, and in being more likely to contain a substantial content of metallic steel. Molten steel draining from the slag tends to form in the bottom of a cinder pot a "button" having a welded connection with the metal of the cinder pot. Such buttons are difficult to remove, and the slag itself even in the absence of solidified steel is frequently difficult of removal.

Chiefly for these reasons it has been desired to use open bottom cinder pots in open hearth plants, and such cinder pots have in the past been used to a substantial extent. An "open-bottom" cinder pot consists merely of a vertical downwardly tapered wall, usually of roughly elliptical contour, and suitable trunnions and lugs projectant from the outer surface of the wall. The bottom is wholly omitted. When, therefore, slag solidifies in the bounding wall which forms the entire fundamental structure of the cinder pot, the slag and any body of solidified steel associated with it may be knocked loose, simply by using a crane to lift the pot, and letting it fall, so that its smaller open end strikes any suitable substantial body, such as a drop-ball or a discarded ingot mold.

In spite of this great advantage the use of open-bottom cinder pots in open-hearth plants has in recent years practically been abandoned. This is because of the slowness with which the slag in open bottom pots cools. Because the pots are bottomless, it is necessary to place them on a smooth closure surface before they receive molten slag. Such surface usually is the surface of a cast iron or steel slab, or stool, on which the lower rim of the cinder pot wall rests, and the joint between which and the cinder pot rim is filled with sandy loam or other suitable sealing material. As the stool is of limited proportions and presents a minimum of heat-dissipating surface, its heat-absorbent capacity is rapidly exceeded. From that point on heat dissipation from the slag in the cinder pot can be only from the upper surface of the slag and through the cinder pot wall. As the wall surface of the cinder pot is small in relation to the volumetric capacity of the cinder pot, heat dissipation is greatly retarded. This consideration requires the use of an excessively great number of open bottom cinder pots to serve an open hearth furnace, and frequently requires that the filled cinder pots be removed from the interior of the plant slowly to cool the slag, as the number of slowly cooling pots would occupy an impractically great floor space within the plant itself.

I have solved these problems, connected with the use of open-bottom cinder pots, by providing free heat dissipation from the filled pots in four directions; namely through the stool on which the cinder pot rests, and from the interior of the slag body in the cinder pot, as well as through the cinder pot wall and from the upper surface of the slag in the cinder pot. This I do without the use of water, or other dangerous agency, to speed cooling of the slag.

In the accompanying drawings, exemplary of structure embodying my invention, Fig. I is a central vertical sectional view through my cinder pot assembly; Fig. II is a plan view thereof; Fig. III is a view in side elevation of the stool element of my cinder pot assembly; and Fig. IV is a view showing in vertical section the "skull" of slag which has been dumped from the cinder pot, and showing in broken lines the wall element of the cinder pot assembly from which it has been dumped.

In the drawings reference numeral 1 designates the wall element of my cinder pot assembly, which wall element is roughly elliptical in contour. Near its upper rim the pot wall has outwardly projecting trunnions, or lifting arms 2, which may be engaged by the hooks of a crane for lifting and moving the wall element. Near its lower rim the wall element has perforate lugs 3 projecting from its outer surface. The trunnions, or lifting arms 2 are in line with each other in the longer axis of the wall element, and the lugs 3 are aligned with each other in the shorter axis of the wall element. Either of the lugs may therefore be engaged to tilt the wall element when the trunnions, or lifting arms, 2 are engaged by crane hooks or are otherwise rotatably supported. It will be noted that the wall element 1 tapers downwardly from its upper rim 4 to its lower rim 5, and that its inner surface 6 has an uninterrupted draft throughout the height of the wall element. This draft helps in discharging a skull of slag from the wall element when the wall element is lifted and inverted.

The stool element of the cinder pot assembly is formed as an open air-cooled structure. This element consists primarily of a base 7, a flat supporting plate 8 on which the wall element of the assembly directly rests, and connecting structure standing vertically between the base and the supporting plate. The wall-supporting plate 8 of the stool has an upstanding rim 9 within which the lower rim 5 of the wall element is received when the wall element is placed on the stool. An adequate seal between the lower rim 5 of the wall element and the surface of the supporting plate 8 may be made by keeping the contacting surfaces of the rim and the plate approximately true, and by using sandy loam or other sealing material at and around the joint between the supporting plate and the rim.

The vertical connecting structure between the base 7 and the supporting plate 8 of the stool consists, as shown, of a plurality of vertical posts 10 arranged to form an open circular web having openings 11; an inner circular web 12, with openings 13; and perforate radial webs 14 connecting the inner and outer webs. This open structure provides free circulation of air into and within the body of the stool. The stool is also made positively to induce air circulation through it. The means for so doing is an upwardly tapered stack 15, preferably cast in one piece with the stool as a continuation of the inner web 12 and supporting plate 8 of the stool. An opening 16 at the base of the stack places it in communication with the interior of the underlying body of the stool.

In the assembly, as shown for example in Figs. I and II of the drawings, the wall element 1, resting on the supporting plate 8 of the stool, surrounds the stack 15; and when the cavity of the cinder pot is filled with molten slag, such slag heats the column of air within the stack. This air column rising tends to draw air into the body of the stool, so that there is a continuous circulation through the body of the stool, against the under surface of supporting plate 8, and upwardly through the stack.

The assembly thus provides heat dissipation at the bottom of the cinder pot cavity and interiorly of the body of slag in it, as well as through the wall of element 1 and from the upper surface of the slag itself. This results in the rapid formation of a thick "skull" in the body of slag, so that the assembly need stand but a short time in cooling. When a skull of adequate thickness has formed, the wall element 1, is lifted carrying with it the skull A, which usually has at its base a steel "washer" B of substantial thickness. The slag or steel at the smaller lower end of the wall element 1 is then struck against some substantial object, as above described, to jar the skull loose, so that it readily falls from the larger end of the wall element when that element is inverted. The steel washer B may then easily be pried from the body of the skull A, and broken into convenient scrap sizes for immediate remelting or for storage. The remaining body of the skull may be removed to the slag-recovery yard.

My invention is important to the extent that it makes the use of open-bottom cinder pots in open-hearth plants practical, and allows such plants to enjoy the advantages inherent in open-bottom cinder pots without the disadvantages previously inseparable from their use. In my assembly a thick strong skull is formed in less than one-third the time required in open-bottom cinder pots the stool for which is a massive slab of iron or steel. In open-hearth plants the time required to work a heat is about twelve hours. The cooling in my open-bottom assembly proceeds so rapidly that a very thick and strong skull is formed well within that working period, so that a single set of cinder pots can be used to care for all the heats in all furnaces of an open-hearth plant. There is safety in the fact that, with my assembly there is no temptation to hurry the dumping of an open pot before a wholly safe skull has formed in it. As the pots are carried by cranes over the heads of workers, this is a matter of fundamental importance. The other safety feature of my assembly, namely that rapid cooling is effected without the use of water, or other dangerous refrigerant is also important.

In practice the advantages rising from the use of open-bottom cinder pots are greater than at once appear. When a pot filled with adequately solidified slag is lifted by a crane for dumping, the crane may keep its hold on the pot (the wall element) until it is returned to its stool for the next filling. That is, the crane may hold the wall section of the pot while the skull is jarred loose, the skull deposited on a suitable surface, desirably the floor of a flat car, and while the wall section is being restored to slag-receiving assembly with its stool element. The cinder pots thus remain continuously in service in the plant itself, without danger from attempting to discharge inadequately solidified slag, and without the trouble and expense of taking the cinder pots to a slag-receiving yard for dumping. It is possible efficiently to serve a battery of open-hearth furnaces with a greatly decreased number of pots, because of this uninterrupted service.

It is possible without fundamentally altering the structural arrangement of my cinder pot assembly to provide two or more stacks rising from the stool of the assembly to extend upwardly within the wall element. It is also possible to make the stack, or stacks, initially separate from the body of the stool, and to secure the stack, or stacks, in mounted position thereon. I prefer, however, a stool organization in which the stack is of one piece with the iron or steel casting of the stool body. The wall element of the assembly is also preferably a one-piece casting of iron or steel.

The application herein is a continuation-in-part of my application Serial No. 276,176, filed May 27, 1939.

I claim as my invention:

1. An air-cooled open-bottom cinder pot assembly for open hearth slag consisting essentially of a wall element enclosing an inwardly and downwardly tapering slag-receiving cavity, a unitary stool element comprising a supporting plate upon which the wall element rests, an upwardly and inwardly tapering circulation-promoting stack rising from said plate through the slag-receiving cavity bounded by the wall element of the assembly, and an open frame structure beneath the plate and arranged to provide circulation beneath the plate of air moving through it towards the stack.

2. An air-cooled open-bottom cinder pot assembly for open hearth slag consisting essentially of a wall element enclosing a slag-receiving cavity, and a stool element comprising a supporting plate upon which the wall element rests, a circulation-promoting stack rising from said plate through the slag-receiving cavity bounded by the wall element of the assembly, and a frame structure beneath the said plate having air openings around its entire periphery initially and directly to produce air circulation beneath the plate outwardly of the said stack and through the said stack to the atmosphere, to encrust the slag in its lower portion for removal of the said wall element with its content of slag prior to solidification of the entire body of slag.

WILLIAM JOHNSTON, JR.